United States Patent
Lattner et al.

(10) Patent No.: US 9,896,525 B2
(45) Date of Patent: Feb. 20, 2018

(54) HOMOGENEOUS POLYMERIZATION PROCESS USING EVAPORATIVE COOLING

(71) Applicant: ExxonMobil Chemical Patents Inc., Baytown, TX (US)

(72) Inventors: James R. Lattner, LaPorte, TX (US); Gabor Kiss, Hampton, NJ (US); Christopher B. Friedersdorf, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/083,410

(22) Filed: Mar. 29, 2016

(65) Prior Publication Data
US 2016/0319054 A1 Nov. 3, 2016

Related U.S. Application Data

(60) Provisional application No. 62/154,534, filed on Apr. 29, 2015.

(51) Int. Cl.
| | | |
|---|---|---|
| *C08F 2/01* | (2006.01) | |
| *C08F 2/06* | (2006.01) | |
| *C08F 210/06* | (2006.01) | |
| *C08L 23/14* | (2006.01) | |
| *C08F 110/06* | (2006.01) | |
| *C08F 210/16* | (2006.01) | |
| *C08F 2/00* | (2006.01) | |
| *B01J 19/18* | (2006.01) | |
| *C08F 4/659* | (2006.01) | |
| *C08F 4/6592* | (2006.01) | |

(52) U.S. Cl.
CPC ............ *C08F 110/06* (2013.01); *B01J 19/18* (2013.01); *B01J 19/1856* (2013.01); *B01J 19/1862* (2013.01); *B01J 19/1881* (2013.01); *C08F 2/001* (2013.01); *C08F 210/06* (2013.01); *C08F 210/16* (2013.01); *C08F 4/65908* (2013.01); *C08F 4/65912* (2013.01); *C08F 4/65925* (2013.01); *C08F 4/65927* (2013.01); *C08L 23/14* (2013.01)

(58) Field of Classification Search
CPC .......... C08F 2/06; C08F 2/001; C08F 4/6592; C08F 110/06; C08F 210/06; C08L 23/14
See application file for complete search history.

(56) References Cited

U.S. PATENT DOCUMENTS

| | | |
|---|---|---|
| 2,885,389 A | 5/1959 | Schappert |
| 2,918,460 A | 12/1959 | Schappert |
| 3,126,460 A | 3/1964 | Dufour |
| 3,891,603 A | 6/1975 | Heil et al. |
| 4,501,865 A | 2/1985 | König et al. |
| 5,859,159 A | 1/1999 | Rossi et al. |
| 6,407,186 B1 | 6/2002 | Rath et al. |
| 6,716,936 B1 | 4/2004 | McGrath et al. |
| 7,423,100 B2 | 9/2008 | McDonald et al. |
| 7,807,769 B2 | 10/2010 | Mehta et al. |
| 7,812,104 B2 | 10/2010 | Canich et al. |
| 8,058,371 B2 | 11/2011 | Brant et al. |
| 2006/0089467 A1 | 4/2006 | McDonald et al. |
| 2006/0155087 A1 | 7/2006 | Fleury |
| 2007/0238841 A1 | 10/2007 | Shaffer et al. |
| 2009/0163678 A1 | 6/2009 | Kiss et al. |
| 2013/0203946 A1 | 8/2013 | Lawson et al. |
| 2014/0213745 A1 | 7/2014 | Jiang et al. |

FOREIGN PATENT DOCUMENTS

| | | |
|---|---|---|
| GB | 826562 | 1/1960 |
| GB | 826563 | 1/1960 |
| WO | WO 1993/021241 | 10/1993 |
| WO | WO 2008/150572 | 12/2008 |

*Primary Examiner* — Caixia Lu

(57) ABSTRACT

This invention relates to a continuous homogeneous solution phase polymerization process comprising contacting, in an evaporative reactor system at a temperature of 50° C. or more and a pressure of 100 kPa or more, a catalyst system, optionally, a hydrocarbon diluent, optionally, scavenger, and one or more monomer(s) to form a homogeneous polymerization medium, where the polymer product is dissolved in the reaction medium at 10 wt % or more (based upon the weight of the polymer present in the effluent at the exit of the reactor) and the catalyst system is dissolved in the reaction medium, and where the catalyst system comprises an activator and a coordination catalyst precursor compound and where all or part of the polymerization medium is evaporated during the polymerization.

24 Claims, 3 Drawing Sheets

HOMOGENEOUS POLYMERIZATION PROCESS USING EVAPORATIVE COOLING

PRIORITY

This invention claims priority to and the benefit of U.S. Ser. No. 62/154,534, filed Apr. 29, 2015.

FIELD OF THE INVENTION

This invention relates to homogeneous olefin polymerization processes using evaporative cooling, such as in boiling pool reactors.

BACKGROUND OF THE INVENTION

Polyolefins are versatile materials used on a million-ton per year scale due to their excellent performance/price position. In some applications, particularly in physically demanding applications, the market needs are addressed by blending two or more polyolefin components. Examples include impact copolymers (ICPs) that comprise a polypropylene continuous phase and a rubber, typically ethylene-propylene copolymer, dispersed phase. These blends often combine high-melting stiff polymers and low-melting or amorphous soft polymers to tune the stiffness-toughness balance of the product. Current processes may blend these components in a compounding extruder. Compounding extruders are expensive machines and typically use significant amounts of energy. In other instances, the components are combined in the polymerization process. However, some of the blend components may be subpar due to the compromises forced by the current technology, such as in the case of ICPs in which it is virtually impossible to tune the rubber component to an optimal composition, composition distribution, and/or molecular weight.

Many current solution processes utilize adiabatic continuous stirred tank reactors (adiabatic CSTRs). These reactors have at least three disadvantages: (1) they require expensive chilling of the feed to absorb the reaction heat and thus allow acceptable single-pass conversion; (2) they are usually limited by agitation considerations to solution viscosity of a few thousand centipoise, which in turn limits single-pass conversion and polymer concentration in the reactor effluent thus increasing the solvent recycle load and cost per unit mass of product; and (3) operate at high pressures to keep all components in the liquid phase and thus the reactor liquid filled. Other conventional reactor designs use internal heat exchangers or external heat exchanger loops to remove the reaction heat. However, these reactors are also expensive to build and operate, and can have solution viscosity limitations and heat transfer surface fouling problems, especially when making high-melting polyolefins, particularly polypropylenes. The manufacturing of such products often requires relatively low temperatures, such as between 85° C. and 140° C. The lower temperature limit takes into account the tendency of the polymer to come out of solution as a solid thus fouling the reactor, the upper temperature takes into account catalyst stability and/or product properties, such as molecular weight and/or tacticity/stiffness/melting properties. Lower temperatures tend to yield higher molecular weight and higher-melting polyolefins; the latter particularly applies to polyolefins of high propylene contents, like polypropylene. These operational limits force the use of large and thus expensive heat exchangers due to the limitations in the temperature of the cooling medium since excessively cold surfaces tend to trigger fouling. The limited temperature difference thus forces the use of increased heat exchange surfaces for removing the reaction heat, which makes the equipment more expensive to fabricate and operate.

Boiling pool reactors have been disclosed in U.S. Pat. Nos. 2,885,389; 2,918,460; 3,126,460; and GB Patent 826, 562. In the processes disclosed, elongated vertical reactors are operated in a slurry mode at a pressure and temperature such that the hydrocarbon continuous phase boils, and is subsequently condensed and returned to the reactor.

U.S. Pat. No. 6,716,936 discloses the use of two or more light solvent boiling pool reactors in series for the polymerization of ethylene and comonomer(s) to produce bimodal polyethylene copolymers having lower densities than polyethylenes made using conventional stirred tank, slurry loop or gas phase reactor technologies where the polymer is not dissolved in the reaction medium.

U.S. Pat. No. 7,423,100 discloses polymerization processes to produce polymers utilizing boiling pool reactor systems and diluents including hydrofluorocarbons where the polymer is present in the reactor as solid particles in a slurry.

U.S. Pat. No. 4,501,865 discloses a process to remove quantities of heat from exothermically running polymerization reactions of vinyl monomers in heterogeneous phase, by adding liquids to the reaction medium for the removal of heat and to regulate the reaction temperature, which liquids do not dissolve the polymer under the reaction conditions and the boiling temperatures of which are lower than or are identical to the technically predetermined reaction temperatures under the polymerization conditions which are applied, and the heat which is released in the reaction system is removed by evaporating these liquids.

US 2014/0213745 discloses a method to prepare, and compositions pertaining to, an amorphous polymer comprising: at least 95 mol % propylene and 0 to 5 mol % vinyl monomer content, wherein the polymer has a $g'_{vis}$ of less than 0.95, an $M_n$ of about 200 to about 10,000, an $\Delta H_f$ of less than 10 J/g and has greater than 50% allylic chain end functionality. At page 10, paragraph 137, US 2014/0213745 states that "[a]ny bulk, homogeneous solution, boiling pool or slurry process known in the art can be used."

U.S. Pat. No. 8,058,371 discloses processes for polymerizing propylene, where: 1) about 40 wt % to about 80 wt % propylene monomer, based on total weight of propylene monomer and diluent, and about 20 wt % to about 60 wt % diluent, based on total weight of propylene monomer and diluent, can be fed into a reactor; 2) the propylene monomer can be polymerized in the presence of a metallocene catalyst and an activator within the reactor at a temperature of about 80° C. or more and a pressure of about 13 MPa or more to produce a polymer product in a homogenous system; and 3) about 20 wt % to about 76 wt % (preferably about 28 wt % to about 76 wt %) propylene monomer, based on total weight of the propylene monomer, diluent, and polymer product, can be present at the reactor exit at steady state conditions.

U.S. Pat. No. 7,807,769 discloses a supercritical process to make isotactic propylene homopolymer having: 1) more than 15 and less than 100 regio defects (sum of 2,1-erythro and 2,1-threo insertions and 3,1-isomerizations) per 10,000 propylene units; 2) an Mw of 35000 g/mol or more; 3) a peak melting temperature of greater than 149° C.; 4) an mmmm pentad fraction of 0.85 or more; 5) a heat of fusion of 80 J/g or more; and 6) a peak melting temperature minus peak crystallization temperature (Tmp–Tcp) of less than or equal to (0.907 times Tmp) minus 99.64 (Tmp–Tcp<(0.907×

Tmp)−99.64), as measured in ° C. on the homopolymer having 0 wt % nucleating agent.

U.S. Pat. No. 7,812,104 discloses a process for producing a propylene-based olefin homopolymer or copolymer, where a monomer composition comprising propylene is contacted with a polymerization catalyst system under homogeneous polymerization conditions (such as solution, supersolution or supercritical conditions), wherein the polymerization catalyst system includes an activator and a bridged bis-indenyl transition metal (group 4) compound substituted with a carbazole (unsubstituted or substituted) at the 4 position.

Additional references of interest include: WO 1993/021241 and US 2013/0203946. None of the above disclose processes that can make both high-melting polymers, such as, for example, polypropylenes and soft, low melting polymers, such as, for example, ethylene-propylene or ethylene-($C_4$-$C_{12}$ alpha olefin) rubbers in an efficient, non-fouling, low-cost process operating with homogeneous polymerization phases and utilizing coordination catalysts (such as single-site catalysts). Thus, there is a need for a clean, efficient, rapid, and low-cost process to make polyolefins and polyolefin blends comprising high-melting and/or low-melting components with enhanced properties in a continuous solution process where the heat of polymerization is removed without causing fouling of the reactor.

The current invention overcomes the limitations discussed above, thus allowing reduced investment and operating costs while also increasing operation reliability by operating the reactor in such a way (e.g., at or near the boiling point of the reaction medium) as to remove the reaction heat by evaporative means. The heat removal rate can be readily controlled by the rate of reflux, a method typically employed in refinery and petrochemical separations. These isothermal reactors thus operate with a homogeneous reaction medium enabling the optimal deployment of coordination catalysts (such as single-site catalysts). They also operate at lower pressures than the liquid filled conventional reactors making them cheaper to build and operate, and can often operate at higher solution viscosity than other designs owing to the agitation provided by the boiling liquid medium. Thus, the current invention provides a process that can produce polymers at higher concentrations while typically having less fouling than current processes.

The process of the instant invention also overcomes the deficiencies discussed above for ICP's by producing the stiff and soft components in separate reactors (one or both of which may use evaporative cooling) in which the process conditions and catalysts are optimized for the two different (stiff and soft) components. Further improvement, particularly for the soft component is also achieved by production in a homogeneous solution process utilizing coordination catalysts (such as single-site catalysts) homogeneous catalyst and, preferably evaporative cooling. Such operation mode and catalysts afford precise composition and molecular weight control and narrow molecular weight and composition distribution of the soft component, all useful to achieving the maximum benefit this component provides for the final product blend. A further benefit of the production of the stiff and soft components in the currently-disclosed separate, independently tunable reactors is the ability to precisely control the molecular weight and melt viscosity of the blend components. This in turn allows the development of the desired high and uniform dispersion of the soft product component in the continuous stiff phase affording the best utilization of the soft component for improving the toughness with the minimal degradation of the stiffness of the final product blend.

Further, the processes disclosed herein have: (1) improved/lower cost cooling due to heat exchange in the absence of polymer, which avoids fouling and increases heat exchange efficiency due to lower viscosity, and (2) higher polymer concentration in the reactor without reducing mixing, and thus without jeopardizing product quality, due to the mixing enhancement from the churn caused by boiling.

The processes of the instant invention operate with coordination catalysts (such as single-site catalysts) in a homogeneous reaction medium, free of slurry, and free of heterogeneous catalyst.

SUMMARY OF THE INVENTION

This invention relates to a continuous homogeneous solution phase polymerization process comprising contacting, in an evaporative reactor system at a temperature of 50° C. or more and a pressure of 100 kPa or more, a catalyst system dissolved in the reaction medium, optional hydrocarbon diluent, optional scavenger, and one or more monomer(s) to form a homogeneous polymerization medium, where the polymer product is dissolved in the reaction medium at 10 wt % or more (determined by measuring the polymer wt % in the effluent at the exit of the reactor), and where the catalyst system comprises an activator and a coordination catalyst precursor compound and where all or part of the polymerization medium is evaporated during the polymerization and optionally, returned to the polymerization reactor after its condensation.

Advantageously, the diluent and/or monomer are partially evaporated during the polymerization to remove the heat of polymerization and the heat of mixing. The evaporated diluent and/or monomer is then condensed and, optionally, further cooled before returning it to the reactor. This creates a continuous recycle (often referred to as reflux in the art of chemical engineering), which effectively removes heat in the form of the heat of evaporation and, optionally, by further cooling of the recycle stream.

DEFINITIONS

Figure 1:
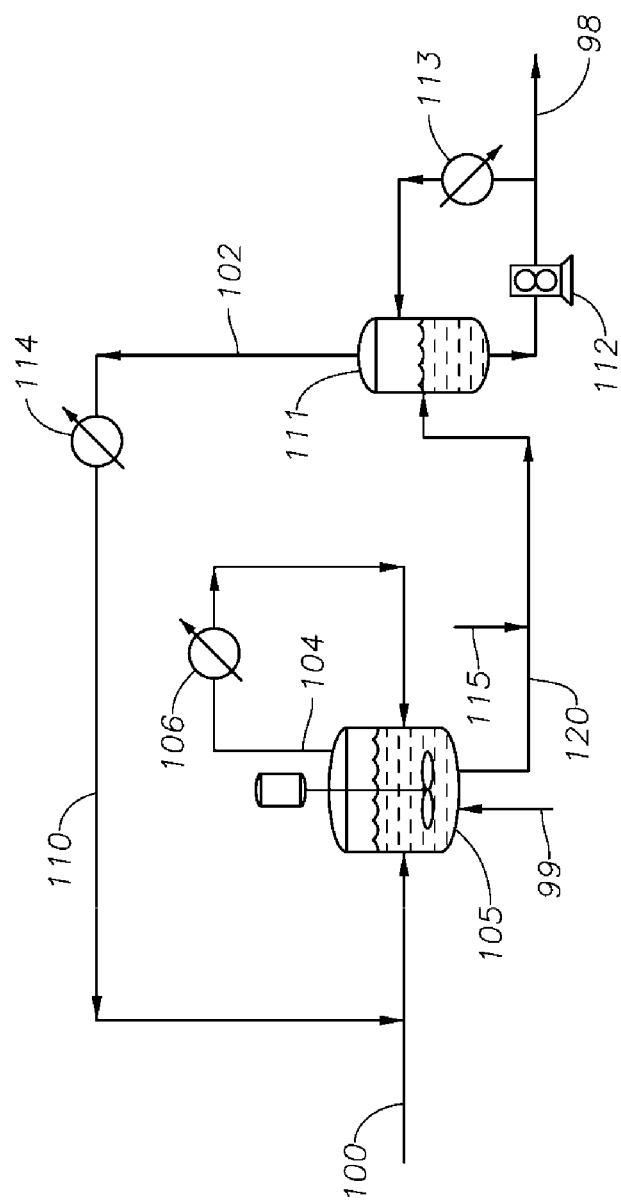
FIG. 1 represents a propylene polymerization process as described in Embodiment 1.

A reactor is any vessel(s) in which a chemical reaction occurs.

An evaporative (polymerization) reactor system is defined to be any polymerization process that utilizes a reactor wherein all or part of the polymerization medium is evaporated during polymerization, where all or part of the evaporated polymerization medium may or may not be condensed and returned to the reactor. Examples of reactors useful in an evaporative reactor system include boiling pool reactors.

As used herein, the chemical elemental groups are referred to following the new numbering scheme for the Periodic Table Groups as reported in CHEMICAL AND ENGINEERING NEWS, 63(5), 27, (1985).

An "olefin," alternatively referred to as "alkene," is a linear, branched, or cyclic compound of carbon and hydrogen having at least one double bond. An "alpha olefin" is a linear, branched, or cyclic compound of carbon and hydrogen having at least one vinylic double bond. For purposes of this invention and the claims appended thereto, when a polymer or copolymer is referred to as comprising an olefin, the olefin present in such polymer or copolymer is the polymerized or derivatized form of the olefin. For example, when a copolymer is said to have an "ethylene" content of 35 wt % to 55 wt %, it is understood that the mer units in the copolymer are derived from ethylene in the polymerization reaction and said derived mer units are present at 35 wt % to 55 wt %, based upon the weight of the copolymer. A "polymer" has two or more of the same or different mer units. A "homopolymer" is a polymer having mer units that are all the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomers of mers with the same composition. Note that the definition of copolymer, as used herein, includes terpolymers, tetrapolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

For purposes of this invention and claims thereto, unless otherwise stated, the term "substituted" means that a hydrogen has been replaced with a heteroatom, or a heteroatom-containing group. For example, a "substituted hydrocarbyl" is a radical made of carbon and hydrogen where at least one hydrogen is replaced by a heteroatom or heteroatom-containing group.

A polymerization system comprises monomer, optional comonomers(s), polymer, optional inert diluent, and, optionally, one or more scavenger compounds.

A catalyst system comprises one or more catalyst precursors, one or more catalyst activators typically dissolved in an inert diluent. Note that for ease of use a catalyst system referred to herein comprises one or more activators and one or more coordination catalyst precursor compounds, and it is also defined to include the result of the combination of the catalyst precursor(s) and the catalyst activator(s), i.e., an activated catalyst or catalyst mixture capable of polymerizing the monomer components of the polymerization system. The activated catalyst is also referred to herein as an active catalyst system or active catalyst. The catalyst system, or active catalyst, or active catalyst system is formed by contacting the one or more catalyst precursors and the one or more activators, typically in solution. The contacting of the one or more catalyst precursors and the one or more activators and thus the preparation of the active catalyst system may be performed prior to feeding the catalyst system to the reactor or can be performed in the polymerization reactor.

A homogeneous catalyst system is a catalyst system that is soluble in the diluent-monomer(s) mixture, or soluble in the monomer(s), if no diluent is present and is dissolved in the polymerization system of the present disclosure. Homogeneous catalyst systems deployed in the present disclosure thus do not include supported catalysts or other type of undissolved catalyst slurries in the polymerization reactor.

A homogeneous polymerization medium is one where the polymerization system and the catalyst system are both homogeneous and intimately mixed. Homogeneous systems in the present disclosure are defined as having no solid polymerization phase present and the components are molecularly dispersed forming a homogeneous fluid medium.

The reactor medium or polymerization medium is the polymerization system plus the catalyst system.

In a homogeneous polymerization system or in a homogeneous reactor medium or in a homogeneous polymerization medium, the components form a single fluid (supercritical or liquid) phase. Particularly, no parts of the homogeneous polymerization system are in the solid state.

A solution (or solution phase) polymerization process is a liquid phase homogeneous polymerization process where the catalyst system is dissolved in a liquid polymerization system.

The term "continuous" means a system that operates without interruption or cessation. For example, a continuous process to produce a polymer would be one where the reactants are continually introduced into one or more reactors and the polymer product is continually withdrawn from said reactors.

As used herein, Mn is the number average molecular weight, Mw is the weight average molecular weight, and Mz is the z average molecular weight, wt % is weight percent, vol % is volume percent, and mol % is mole percent. Molecular weight distribution (MWD), also referred to as polydispersity (PDI), is defined to be the value obtained by dividing Mw by Mn. Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is normal propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane.

Room Temperature (RT) is 21.1° C. (70° F.) unless otherwise noted.

DETAILED DESCRIPTION OF THE INVENTION

The invention provides for solution polymerization processes to produce polymers utilizing evaporative reactor systems (such as boiling pool reactor systems). In particular, the invention provides for a polymerization process comprising contacting a catalyst system with one or more monomers in a homogeneous polymerization medium, wherein at least a part of the polymerization medium is evaporated during the polymerization and, preferably, the evaporated polymerization medium is condensed and returned to the reactor.

This invention also relates to a continuous solution phase polymerization process comprising contacting, at a temperature of 50° C. or higher, (advantageously 50° to 200° C., or 60° to 200° C., or 70° to 200° C., or 80° to 200° C., or 90° to 200° C., or 100° to 200° C., or 110° to 200° C., or 50° to 185° C., or 60° to 180° C., or 70° to 180° C., or 80° to 180° C., or 90° to 180° C., or 100° to 180° C., or 110° to 180° C., or 50° to 160° C., or 60° to 160° C., or 70° to 160° C., or 80° to 160° C., or 90° to 160° C., or 100° to 160° C., or 110° to 160° C., or 50° to 150° C., or 60° to 150° C., or 70° to 150° C., or 80° to 150° C., or 90° to 150° C., or 100° to 150° C., or 110° to 150° C., or 50° to 140° C., or 60° to 140° C., or 70° to 140° C., or 80° to 140° C., or 90° to 140° C., or 100° to 140° C., or 110° to 140° C.) and at a pressure of 10 to 20,000 kPa above the ambient pressure (advantageously 100 to 15,000 kPa, or 100 to 10,000 kPa, or 100 to 7,000 kPa, or 30 to 400 kPa above the ambient pressure), monomer, optional comonomer, optional diluent, and a catalyst system, in a homogeneous polymerization system, where all or part of the homogeneous polymerization system is evaporated during the polymerization, and the polymer product is dissolved in the homogeneous polymerization system at 5 wt % or more, or 10 wt % or more, or 12 wt % or more, or 15 wt % or more, or 20 wt % or more (based upon the total weight of the effluent exiting the reactor, determined by measuring the polymer concentration in the effluent immediately as it exits the reactor), and where the catalyst system comprises one or more activator and one or more coordination catalyst compounds and, optionally, an impurity scavenger compound.

In useful processes disclosed herein a "solution phase polymerization" or "homogeneous polymerization" has at least 90 wt %, or at least 95 wt %, or at least 99 wt % of the polymer product dissolved in the reaction medium. Preferably 100% of the polymer product is dissolved in the reaction medium.

By "evaporated" is meant that at least a part of the polymerization medium, preferably monomer, comonomer and/or diluent, is transferred to the vapor phase. In the process of the current disclosure, the thus-formed vapors then are typically condensed and, optionally, further cooled after which a part or all of the condensate is returned to the reactor. This type of heat removal/cooling is called reflux in the art of chemical engineering and in the art of distillation, such as crude refining.

By "coordination catalyst compound" is meant unsupported polymerization catalyst precursor compounds used to prepare polymerization catalyst systems that are known in the art of polymerization as single site catalysts (such as, for example, bis-cyclopentadienyl metallocenes and the like, or constrained geometry, or late transition metal compounds). These coordination catalyst compounds have been shown to form active catalyst systems, and to bind the monomers and the growing chain to the central metal atom (typically a group 4 or group 8 transition metal) of the catalyst. Catalyst types useful for the practice of the present disclosure are described, for example, in Metallocene-Based Polyolefins, J. Scheirs and W. Kaminsky, Ed., Wiley, 2000 (ISBN 0-471-98086-2) and Stereoselective Polymerization with Single-Site Catalysts, L. S. Baugh and J. A. M. Canich, Ed., CRC, 2008, (ISBN-13 978-1-57444-579-4). They are distinctly different from anionic and cationic polymerization catalysts often used in making synthetic rubber. The latter catalysts typically generate a growing polymer chain that is charged and is not bound to the catalyst while the polymer chain is growing.

Polymerization Process

This invention relates to a continuous homogeneous solution phase polymerization process comprising contacting, in an evaporative reactor system at a temperature of 50° C. or more and a pressure of 10 kPa or more, a catalyst system, optionally a hydrocarbon diluent, optionally scavenger, and one or more monomer(s) to form a homogeneous polymerization medium, where the polymer product is dissolved in the reaction medium at 10 wt % or more and the catalyst system is dissolved in the polymerization system, and where the catalyst system comprises activator and coordination catalyst precursor compound. The amount of polymer product dissolved in the reaction medium is determined by sampling the effluent at the exit of the reactor and determining the wt % polymer in the effluent, where the wt % is based upon the weight of the effluent.

In the previous embodiment, the contacting may occur in a boiling pool reactor system.

In the previous embodiments, the boiling pool reactor system may comprise a continuous stirred tank reactor (CSTR).

In the previous embodiments, the CSTR may comprise a plurality of injection ports and zones for the one or more monomer(s).

In any of the previous embodiments, the stirred tank reactor may comprise a plurality of injection ports and zones for the catalyst system.

In any of the embodiments described herein, the catalyst system may comprise one or more catalyst precursors as described herein, and one or more activators, each being fed separately or together through one or a plurality of injection zones into the reactor.

In any of the previous embodiments, when present, the stirred tank reactor may comprise a discharge screw.

In any of the previous embodiments, when present, the continuous stirred tank reactor may comprise a stirrer.

In any of the previous embodiments, when present, the continuous stirred tank reactor may comprise one or more axial flow impeller(s), or one or more radial flow impeller(s), or combinations thereof.

In certain embodiments, the continuous stirred tank reactor, when present, is absent a mechanical stirrer.

In any of the previous embodiments, the evaporated polymerization medium (advantageously one or more of the monomer, comonomer and diluent) may be collected, optionally, compressed, condensed, further cooled, and returned to the polymerization medium.

In any of the previous embodiments, the polymerization process may further comprise the steps of: (a) cooling the polymerization medium (preferably one or more of the monomer, comonomer and diluent); (b) supplying the cooled polymerization medium to a reactor; and (c) removing polymer at the reactor outlet.

In preferred embodiments, the polymerization processes and media as described in any of the embodiments above produce one or more polymers that include ethylene or propylene homopolymers (i.e., polyethylene or polypropylene, respectively), ethylene-propylene or ethylene-butene, or ethylene-hexene, or ethylene-octene, or ethylene-decene copolymers, ethylene-propylene-diene copolymers with one or more dienes, or styrene-containing homo- and copolymers, and the like.

A boiling pool reactor system may be used in combination in any of the aforementioned embodiments or could be used in combination with other reactor types, such as loop reactors, adiabatic or isothermal CSTRs, tubular reactors, etc.

In any of the aforementioned embodiments, the polymerization temperature may be from 50° to 200° C., alternatively, from 50° to 180° C., alternatively, from 50° to 160° C., and alternatively, from 50° to 140° C.

In any of the aforementioned embodiments, the polymerization medium (advantageously one or more of the monomer, comonomer and diluent) may be evaporated at pressures from 10 to 20,000 kPa above the ambient pressure or from 100 to 20,000 kPa, or from 100 to 10,000 kPa, or from 100 to 8,000 kPa, or from 100 to 6,000 kPa.

The evaporation rate required to maintain a desired reaction temperature is proportional to the heat generated from the polymerization reactions. For example, in Embodiment 1 below (FIG. 1), to achieve 23 wt % polymer in the reaction medium (as measured in the effluent upon exit of the reactor), the evaporation/reflux rate (stream 104) would be 81% of the reactor feed (streams 100+110) by weight.

Usefully, at least 5 wt % of the combination of the monomer and comonomer and/or diluent is evaporated, based upon the weight of the monomer, comonomer and diluent fed into the reactor, alternately from 10 to 99 wt %, alternately from 50 to 95 wt %.

In another embodiment, the polymer product present in the effluent at the exit of the reactor is present at 10 wt % or more (based upon the weight of the effluent at the exit of the reactor), preferably 15 wt % or more, preferably 20 wt % or more, alternately from 5 to 80 wt %.

Polymerization processes of this invention can be carried out in any manner known in the art. Any homogeneous bulk and solution phase polymerization process known in the art can be used. Such processes can be run in a batch, semi-batch, or continuous mode. Homogeneous polymerization processes are preferred. (A homogeneous polymerization process is defined to be a process where the product is soluble in the reaction media.) A bulk homogeneous process is also useful. (A bulk process is defined to be a process where monomer concentration in all feeds to the reactor is 70 vol % or more.)

In some embodiments, no solvent or diluent is present or added in the reaction medium and the homogeneous polymerization is performed in the bulk monomer phase (except for the small amounts used as the carrier for the catalyst system or other additives, or amounts typically found with the monomer; e.g., propane in propylene). Bulk homogeneous polymerization operation mode is particularly advantageous with olefin feeds comprising substantial concentrations (typically more than 30 wt %) of monomers having more than three carbon atoms, such as butane-1, or hexane-1, etc.

Polymerizations of the current disclosure can be run at any temperature and/or pressure suitable to obtain the desired polymers while also affording heat removal via the evaporative reflux (boiling pool) disclosed herein. Typical temperatures and/or pressures include a temperature in the range of from about 50° C. to about 200° C., preferably about 80° C. to about 180° C.; and at a pressure in the range of 10 to 20,000 kPa above the ambient pressure (advantageously 100 to 15,000 kPa, or 100 to 10,000 kPa, or 100 to 7,000 kPa above the ambient pressure).

In a typical polymerization, the residence time of the reaction is up to 90 minutes, preferably in the range of from about 1 to 90 minutes, or from about 5 to 60 minutes, or from about 5 to 45 minutes, or from about 5 to 30 minutes. The residence time here is defined as the mass inventory (e.g., in kilograms or in pounds, or in tons) in the reactor divided by the feed rate in mass per minute (e.g., in kilograms or in pounds, or in tons per minute). In this calculation the mass units used in the inventory and in the feed rate must be identical.

In some embodiments, hydrogen is present in the polymerization reactor at a partial pressure of 0.001 to 50 psig (0.007 to 345 kPa), preferably from 0.001 to 25 psig (0.007 to 172 kPa), more preferably 0.001 to 10 psig (0.007 to 70 kPa). The unit psig stands for gauge pressure, i.e., above the ambient pressure.

The invention may be practiced in continuous and batch processes. Continuous reactor operation mode is particularly useful. Further, the invention may be practiced in stirred tank reactors. In particular, this invention may be practiced in continuous two phase (vapor+liquid) stirred tank reactors in which the liquid forms a single homogeneous phase that contains no polymer solids. Additional illustrative examples include any reactor selected from the group consisting of a continuous flow stirred tank reactor, a boiling pool reactor, and an auto-refrigerated boiling-pool reactor.

In a preferred embodiment, the polymerization processes described herein utilize a boiling pool reactor system. It is well within the understanding in the art that the polymerization temperature is dependent upon the combination of the desired molecular weight and composition of the product polymer and the composition of the polymerization medium, particularly the concentration of the monomers, and the pressure within the reactor; it is also well within the skill in the art on how to adjust such parameters to obtain any desired polymerization temperature.

In an aspect of the invention, the polymerization processes of the present invention are practiced with a boiling pool reactor system. In some embodiments, a boiling pool reactor system comprises the steps of: (a) cooling a feed stream of a monomer mixture, a diluent, and optionally, a catalyst system, to a polymerization temperature of 50° to 200° C. by vaporization of a portion thereof under reduced pressure to form a cooled feed stream; (b) supplying the cooled feed stream to a boiling pool reactor and polymerizing therein under evaporative conditions at a constant pressure of 0.1 to 4 bar absolute using a catalyst system; and (c) removing polymer product, at a concentration, for example, of at least 50% for recovery and a vaporized mixture of unreacted monomers and polymerization medium, for recycle, generally at the reactor outlet.

The feed stream is generally continuously supplied along with the monomer mixture, the diluent, and, optionally, catalyst system components.

In certain embodiments, the monomer mixture comprises from 51 wt % to 100 wt % of monomer and 49 wt % to 0 wt % of one or more comonomers (based on the weight of monomer mixture). In an embodiment, the monomer mixture may be 100% ethylene or propylene (based on the monomers present), or may be a combination of ethylene and or propylene and one or more of comonomers selected from $C_4$ to $C_{16}$ olefins and non-conjugated dienes, and the comonomers may be linear (such as, for example, ethylene, propylene, $C_4$-$C_{16}$ alpha olefins and $C_6$ to $C_{20}$ alpha-omega dienes) or may contain one or multiple rings (such as styrene, cyclopentadiene, dicyclopentadiene, ethylidene norbornene, vinylnorbornene, etc.).

This invention may also be practiced in batch reactors where the monomers, diluent, and catalyst are charged to the reactor and then polymerization proceeds to completion (such as by quenching) and the polymer is then recovered.

In certain embodiments, the invention is practiced as a solution polymerization process. Typically, the polymerization is carried out where the catalyst, monomer, and diluent are present in a single liquid phase that is refluxed to maintain the polymerization temperature. Preferably, the polymerization is carried out in a continuous polymerization process in which the catalyst, monomer(s), and diluent are present as a single liquid phase. Preferably the process is a homogeneous process, in that the components of the liquid phase present in the reactor are mixed on a molecular level and no polymer or catalyst solids are present.

In an embodiment of the invention, the polymerization process is a continuous process.

The order of contacting the monomer feed stream, catalyst, activator, and diluent may vary from one embodiment to another.

In another embodiment, the catalyst and activator are pre-complexed by mixing together in the selected diluent for a prescribed amount of time ranging from 0.01 seconds to 24 hours, before the feed comprising the activated catalyst is injected into the continuous reactor through a catalyst nozzle or injection apparatus. In yet another embodiment, the catalyst and the activator are added to the reactor separately and contacted in the reactor. In this case, the active catalyst forms in the reactor itself by the reaction between the catalyst precursor and the activator.

In an embodiment of the invention, the catalyst precursor compound and the activator are allowed to pre-react by mixing together in the selected diluent at temperatures between 0 and 200° C., with a contact time between 0.01 seconds and several hours, and between 0.1 seconds and 60 minutes, or less than 30 minutes, or less than 5 minutes, or less than 3 minutes, or between 0.2 seconds and 1 minute before injection into the reactor.

The overall residence time in the reactor can vary, depending upon, e.g., catalyst activity and concentration, monomer concentration, feed injection rate, production rate, reaction temperature, and desired molecular weight, and, generally, will be between about a few seconds and five hours, and typically between about 5 and 60 minutes. Variables influencing residence time include the monomer and diluent feed injection rates and the overall reactor volume. In the process design phase, the choice of residence time is driven by the economic balance between investment costs, like reactor, recycle loop size, etc., and operating costs, like catalyst consumption, recycle rate, etc. Typically, the same products can be made at more than one residence time by adjusting other process variables to maintain the same reactor conditions, particularly the same monomer concentrations, monomer composition, and reaction temperature.

The reactor will contain sufficient amounts of the catalyst system of the present invention to catalyze the polymerization of the monomer containing feed stream such that a sufficient amount of polymer having desired characteristics is produced. The feed stream in one embodiment contains a total monomer concentration greater than 20 wt % (based on the total weight of the monomers, diluent, and catalyst system), greater than 25 wt % in another embodiment. In yet another embodiment, the feed stream will contain from 30 wt % to 60 wt % monomer concentration based on the total weight of monomer, diluent, and catalyst system.

Monomers

Monomers which may be polymerized by this system include any double bond containing hydrocarbon monomer that is polymerizable using catalysts soluble in the polymerization medium. Preferred monomers include one or more of olefins, alpha-olefins, disubstituted olefins, isoolefins, non-conjugated dienes, styrenics and/or substituted styrenics and vinyl ethers. The styrenic monomer may be substituted (on the ring) with an alkyl, aryl, halide, or alkoxide group. Preferably, the monomer contains 2 to 40 carbon atoms, more preferably 2 to 20, or 2 to 12 carbon atoms. Examples of preferred olefins include ethylene, propylene, butene-1, pentene-1, hexene-1, heptene-1, octene-1, nonene-1, decene-1, undecene-1, dodecene-1, and the like. Useful monomers may also be combinations of two or more monomers.

The monomers may be present in the polymerization medium as measured at the reactor outlet in an amount ranging from 80 wt % to 0.01 wt % in one embodiment, alternatively 70 wt % to 0.1 wt %, alternatively from 60 wt % to 0.2 wt %, alternatively 50 wt % to 0.2 wt %, alternatively 40 wt % to 0.2 wt %, alternatively from 30 wt % to 0.2 wt % in another embodiment, alternatively from 20 wt % to 0.2 wt % in another embodiment, alternatively from 15 wt % to 0.2 wt % in another embodiment, alternatively from 10 wt % to 0.2 wt % in another embodiment.

Monomers useful herein also include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. In a preferred embodiment of the invention, the monomer comprises propylene and optional comonomers comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may, optionally, include heteroatoms and/or one or more functional groups. In another preferred embodiment of the invention, the monomer comprises ethylene and optional comonomer comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_2$ to $C_{40}$ olefin monomers and optional comonomers include ethylene, propylene, butane-1, pentene-1, hexene-1, heptene-1, octene-1, nonene-1, decene-1, undecene-1, dodecene-1, styrene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, styrene, cyclopentene, dicyclopentadiene, norbornene, norbornadiene, and their respective homologs and derivatives.

In some embodiments, one or more dienes are present in the polymer produced herein at up to 15 wt %, preferably at 0.00001 to 15 wt %, preferably 0.002 to 15 wt %, even more preferably 0.003 to 15 wt %, based upon the total weight of the composition. In some embodiments, 1000 wt ppm or less of diene is added to the polymerization, or 500 wt ppm or less, or 300 wt ppm or less. In other embodiments at least 50 wt ppm of diene is added to the polymerization, or 100 wt ppm or more, or 150 wt ppm or more.

Preferred diolefin monomers useful in this invention include any hydrocarbon structure, preferably $C_4$ to $C_{40}$, having at least two unsaturated bonds, wherein at least two of the unsaturated bonds are readily incorporated into a polymer by either a stereospecific or a non-stereospecific catalyst(s). These dienes typically contain non-conjugated double bonds. It is further preferred that the diolefin monomers be selected from alpha-omega diene monomers (i.e., di-vinyl monomers). In some embodiments, the alpha-omega diolefin monomers are linear di-vinyl monomers, most preferably those containing from 4 to 40 carbon atoms. Examples of dienes include ethylidene-norbornene, vinylidene-norbornene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-icosadiene, 1,20-heneicosadiene, 1,21-docosadiene, 1,22-tricosadiene, 1,23-tetracosadiene, 1,24-pentacosadiene, 1,25-hexacosadiene, 1,26-heptacosadiene, 1,27-octacosadiene, 1,28-nonacosadiene, 1,29-triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene. Preferred cyclic dienes include cyclopentadiene, vinylnorbornene, norbornadiene, ethylidene-norbornene, vinylidene-norbornene, divinylbenzene, dicyclopentadiene or higher ring containing diolefins with or without substituents at various ring positions.

In some embodiments, the feed concentration of the inert diluent for the polymerization is 80 wt % diluent or less, or 60 wt % or less, or 40 wt % or less, based on the total weight of the feed stream. Alternately, the polymerization is run in a bulk process in the essential absence of an inert solvent.

Catalyst Systems

For the purposes of this invention and the claims thereto, when some catalyst systems are described as comprising neutral stable forms of the components, it is well understood by one of ordinary skill in the art, that the ionic form of the component is the form that reacts with the monomers to produce polymers. Catalyst systems may be prepared in-situ (i.e., by contacting the components in the reactor) or ex-situ (i.e., by contacting some or all of the components before introduction into the reactor).

In the description herein, the term catalyst may be described as a catalyst precursor, a pre-catalyst compound, active catalyst, catalyst compound or a transition metal compound, and these terms are used interchangeably but can be clearly understood and distinguished based on the context of their use. The active polymerization catalysts are often very reactive, consequently unstable, thus are usually not manufactured and shipped in their active form, but rather generated in the polymerization process in-situ or right before their use instead. Thus, typically, the active catalysts used in polymerizations of the current disclosure are generated by reacting a catalyst precursor with a catalyst activator in the polymerization plant before feeding them to the reactor or in the reactor. A polymerization catalyst system is a catalyst system that can polymerize monomers to polymers. An "anionic ligand" is a negatively charged chemical species. Its negative charge is balanced by the positive charge of the metal central atom of the active catalyst.

A metallocene catalyst or metallocene catalyst compound is a catalyst compound comprising a transition metal, typically a group 4 transition metal, which is bound to at least one substituted or unsubstituted cyclopentadienyl ligand. For purposes of this invention and claims thereto in relation to metallocene catalyst compounds, the term "substituted" means that a hydrogen group has been replaced with a hydrocarbyl group, a heteroatom, or a heteroatom-containing group. For example, methyl cyclopentadiene (Cp) is a Cp group substituted with a methyl group. The term cyclopentadienyl ligand is used herein to mean an unsaturated cyclic hydrocarbyl ligand that can consist of one ring, or two or more fused or catenated rings, one of which is an aromatic $C_5$ ring. Substituted or unsubstituted cyclopentadienyl ligands, indenyl ligands, and fluorenyl ligands are all examples of cyclopentadienyl ligands. (It should be noted that indenyl can be considered as cyclopentadienyl with a fused benzene ring attached. Analogously, fluorenyl can be considered as cyclopentadienyl with two benzene rings fused to the five-membered ring on the cyclopentadienyl).

Catalyst Compounds

Any pre-catalyst compound (catalyst precursor compound) that can produce the desired polymer species may be used in the practice of this invention. Pre-catalyst/catalyst precursor compounds, which may be utilized in the process of the invention, include: metallocene transition metal compounds (containing one or two cyclopentadienyl ligands per metal atom), non-metallocene early transition metal compounds (including those with amide and/or phenoxide type ligands), non-metallocene late transition metal compounds (including those with diimine or diiminepyridyl ligands), non-metallocene catalyst compounds described in WO 03/040095, WO 03/040201, WO 03/040233, and WO 03/040442, and other transition metal compounds.

Generally, bulky ligand metallocene compounds (pre-catalysts) useful in this invention include half- and full-sandwich compounds having one or more bulky, often cyclic ligands bonded to at least one metal atom. Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms, such as, but not limited to, those cyclopentadienyl ligands or cyclopentadienyl-type ligand structures or other similar functioning ligand structure such as a pentadienyl, a cyclooctatetraendiyl, a cyclobutadienyl, or a substituted allyl ligand. Other ligands that can function similarly to a cyclopentadienyl-type ligand include: amides, phosphides, imines, phosphinimines, amidinates, and ortho-substituted phenoxides. The metal atom is preferably selected from Groups 3 through 15 and the lanthanide or actinide series of the Periodic Table of Elements. Preferably, the metal is a transition metal from Groups 3 through 12, more preferably, Groups 4, 5, and 6, and most preferably, the transition metal is from Group 4.

In one embodiment, the catalyst composition useful herein includes one or more bulky ligand metallocene catalyst compounds represented by the formula:

$$L^A L^B MQ^*_n \qquad (1)$$

where M is a metal atom from the Periodic Table of the Elements and may be a Group 3 to 12 metal or from the lanthanide or actinide series of the Periodic Table of Elements, preferably M is a Group 4, 5, or 6 transition metal, more preferably M is a Group 4 transition metal, even more preferably, M is zirconium, hafnium, or titanium, Q* is a monoanionic ligand, and n is 0, 1, or 2. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom-containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, dibenzo[b,h]fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine (see WO 99/40125), pyrrolyl ligands, pyrozolyl ligands, carbazolyl ligands, boratobenzene ligands and the like, including hydrogenated versions thereof, for example, tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include, but are not limited to, bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula 1 only one of either $L^A$ or $L^B$ is present.

Independently, each $L^A$ and $L^B$ may be unsubstituted or substituted with a combination of substituent groups R*. Non-limiting examples of substituent groups R* include one or more from the group selected from hydrogen, or linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, arylamino radicals or combinations thereof. In a preferred embodiment, substituent groups R* have up to 50 non-hydrogen atoms, preferably from 1 to 30 carbons, that can also be substituted with halogens or heteroatoms or the like. Non-limiting examples of alkyl substituents R* include methyl, ethyl, propyl, butyl, pentyl, hexyl, cyclopentyl, cyclohexyl, benzyl or phenyl groups and the like, including all their isomers, for example, tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron, for example; and disubstituted pnictogen radicals including dimethylamine, dimethylphosphine, diphenylamine, methylphenylphosphine, chalcogen radicals including methoxy, ethoxy, propoxy, phenoxy, methylsulfide, and ethylsulfide. Non-hydrogen substituents R* include the atoms carbon, silicon, boron, aluminum, nitrogen, phosphorous, oxygen, tin, sulfur, germanium and the like, including olefins such as, but not limited to, olefinically unsaturated substituents including vinyl-terminated ligands, for example, but-3-enyl, prop-2-enyl, hex-5-enyl, and the like. Also, at least two R* groups, preferably two adjacent R groups, are joined to form a ring structure having from 3 to 30 atoms selected from carbon, nitrogen, oxygen, phosphorous, silicon, germanium, aluminum, boron, or a combination thereof. Also, a substituent group, R*, may also be a di-radical bonded to L at one end and forming a carbon sigma bond to the metal M. Other ligands may be bonded to the metal M, such as at least one leaving group Q*. In one embodiment, Q* is a monoanionic labile ligand having a sigma-bond to M. Depending on the oxidation state of the metal, the value for n is 0, 1, or 2, such that Formula 1 above represents a neutral bulky ligand metallocene catalyst compound. Non-limiting examples of Q* ligands include weak bases such as amines, phosphines, ethers, carboxylates, dienes, hydrocarbyl radicals, having from 1 to 20 carbon atoms, hydrides or halogens and the like, or a combination thereof. In another embodiment, two or more Q*'s form a part of a fused ring or ring system. Other examples of Q* ligands include those substituents for R* as described above and including cyclobutyl, cyclohexyl, heptyl, tolyl, trifluoromethyl, tetramethylene (both Q*), pentamethylene (both Q*), methylidene (both Q*), methoxy, ethoxy, propoxy, phenoxy, bis(N-methylanilide), dimethylamide, dimethylphosphide radicals and the like.

In another embodiment, the catalyst composition useful herein may include one or more bulky ligand metallocene catalyst compounds where $L^A$ and $L^B$ of Formula 1 are bridged to each other by at least one bridging group, A*, as represented by Formula 2.

$$L^A A^* L^B M Q^*_n \qquad (2)$$

The compounds of Formula 2 are known as bridged, bulky ligand metallocene catalyst compounds. $L^A$, $L^B$, M, Q* and n are as defined above and A* is a bridging group. Non-limiting examples of bridging group A* include bridging groups containing at least one Group 13 to 16 atom, often referred to as a divalent moiety such as, but not limited to, at least one of a carbon, oxygen, nitrogen, silicon, aluminum, boron, germanium and tin atom or a combination thereof. Preferably bridging group A* contains a carbon, silicon or germanium atom, most preferably A* contains at least one silicon atom or at least one carbon atom. The bridging group A* may also contain substituent groups R* as defined above including halogens and iron. Non-limiting examples of bridging group A* may be represented by R'$_2$C, R'$_2$CCR'$_2$, R'Si, R'$_2$SiCR'$_2$, R'$_2$SiSiR'$_2$, R'Ge, R'P, R'N, R'B where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula 2 have two or more bridging groups A* (see EP 664 301 B1). In another embodiment, the bulky ligand metallocene catalyst compounds are those where the R* substituents on the bulky ligands $L^A$ and $L^B$ of Formulas 1 and 2 are substituted with the same or different number of substituents on each of the bulky ligands. In another embodiment, the bulky ligands $L^A$ and $L^B$ of Formulas 1 and 2 are different from each other.

Other bulky ligand metallocene catalyst compounds and catalyst systems useful in the invention may include those described in U.S. Pat. Nos. 5,064,802; 5,145,819; 5,149,819; 5,243,001; 5,239,022; 5,276,208; 5,296,434; 5,321,106; 5,329,031; 5,304,614; 5,677,401; 5,723,398; 5,753,578; 5,854,363; 5,856,547; 5,858,903; 5,859,158; 5,900,517; and 5,939,503; and PCT publications WO 93/08221; WO 93/08199; WO 95/07140; WO 98/11144; WO 98/41530; WO 98/41529; WO 98/46650; WO 99/02540; and WO 99/14221; and European publications EP-A-0 578 838; EP-A-0 638 595; EP-B-0 513 380; EP-A1-0 816 372; EP-A2-0 839 834; EP-B1-0 632 819; EP-B1-0 748 821; and EP-B1-0 757 996; all of which are herein fully incorporated by reference.

In another embodiment, the catalyst compositions of the invention may include bridged heteroatom, mono-bulky ligand metallocene compounds. These types of catalysts and catalyst systems are described in, for example, PCT publications WO 92/00333; WO 94/07928; WO 91/04257; WO 94/03506; WO 96/00244; WO 97/15602; and WO 99/20637; and U.S. Pat. Nos. 5,057,475; 5,096,867; 5,055,438; 5,198,401; 5,227,440; and 5,264,405; and European publication EP-A-0 420 436, all of which are herein fully incorporated by reference.

In another embodiment, the catalyst composition of the invention includes one or more bulky ligand metallocene catalyst compounds represented by Formula 3:

$$L^C A^* J^* M' Q^*_n \quad (3)$$

where M' is a Group 3 to 16 metal atom or a metal selected from the Group of actinides and lanthanides of the Periodic Table of Elements, preferably M' is a Group 3 to 12 transition metal, and more preferably M' is a Group 4, 5, or 6 transition metal, and most preferably M' is a Group 4 transition metal in any oxidation state, and is especially titanium; $L^C$ is a substituted or unsubstituted bulky ligand bonded to M; J* is bonded to M; A* is bonded to J* and $L^C$; J* is a heteroatom ancillary ligand; and A* is a bridging group; Q* is a univalent anionic ligand; and n is the integer 0, 1, or 2. In Formula 3 above, $L^C$, A* and J* form a fused ring system. In an embodiment, $L^C$ of Formula 3 is as defined above for $L^A$. A*, M and Q* of Formula 3 are as defined above in Formula 1 and 2. In Formula 3, J* is a heteroatam-containing ligand in which J* is an element with a coordination number of three from Group 15 or an element with a coordination number of two from Group 16 of the Periodic Table of Elements. Preferably J* contains a nitrogen, phosphorus, oxygen or sulfur atom with nitrogen being most preferred. In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous, and tin. Examples of these bulky ligand metallocene catalyst compounds are described in WO 96/33202; WO 96/34021; WO 97/17379; WO 98/22486; EP-A1-0 874 005; and U.S. Pat. Nos. 5,637,660; 5,539,124; 5,554,775; 5,756,611; 5,233,049; 5,744,417; and 5,856,258; all of which are herein incorporated by reference.

In one embodiment, the bulky ligand metallocene compounds (pre-catalysts) are those complexes based on bidentate ligands containing pyridine or quinoline moieties, such as those described in U.S. Ser. No. 09/103,620, filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752; 5,747,406; and EP-B1-0 735 057, all of which are herein fully incorporated by reference.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference.

Still other useful catalysts include those multinuclear metallocene catalysts as described in WO 99/20665 and U.S. Pat. No. 6,010,794, and transition metal metaaracyle structures described in EP 0 969 101 A2, which are incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example, see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. Ser. No. 09/191,916, filed Nov. 13, 1998.

The Group 15 containing metal compounds utilized in the catalyst composition of the invention are prepared by methods known in the art, such as those disclosed in EP 0 893 454 A1; U.S. Pat. No. 5,889,128; and the references cited in U.S. Pat. No. 5,889,128; which are all incorporated herein by reference. U.S. Ser. No. 09/312,878, filed May 17, 1999, discloses a gas or slurry phase polymerization process using a supported bisamide catalyst, which is also incorporated herein by reference.

For additional information of Group 15 containing metal compounds, please see Mitsui Chemicals, Inc. in EP 0 893 454 A1, which discloses transition metal amides combined with activators to polymerize olefins.

In one embodiment, the Group 15 containing metal compound is allowed to age prior to use as a polymerization. It has been noted on at least one occasion that one such catalyst compound (aged at least 48 hours) performed better than a newly prepared catalyst compound.

It is further contemplated that bis-amide based pre-catalysts may be used. Exemplary compounds include those described in the patent literature. International patent publications WO 96/23010; WO 97/48735; and Gibson, et al., *Chem. Comm.*, pp. 849-850, (1998), which disclose diimine-based ligands for Group 8-10 compounds that undergo ionic activation and polymerize olefins. Polymerization catalyst systems from Group-5-10 metals, in which the active center is highly oxidized and stabilized by low-coordination-number, polyanionic, ligand systems, are described in U.S. Pat. No. 5,502,124 and its divisional U.S. Pat. No. 5,504,049. See also the Group 5 organometallic catalyst compounds of U.S. Pat. No. 5,851,945 and the tridentate-ligand-containing, Group 5-10, organometallic catalysts of U.S. Pat. No. 6,294,495. Group 11 catalyst precursor compounds, activatable with ionizing cocatalysts, useful for olefin and vinylic polar molecules are described in WO 99/30822.

Other useful catalyst compounds are those Group 5 and 6 metal imido complexes described in EP-A2-0 816 384 and U.S. Pat. No. 5,851,945, which are incorporated herein by reference. In addition, metallocene catalysts include bridged bis(arylamido) Group 4 compounds described by D. H. McConville, et al., in Organometallics, 1195, 14, pp. 5478-5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference.

U.S. Pat. No. 5,318,935 describes bridged and unbridged, bisamido catalyst compounds of Group 4 metals capable of α-olefins polymerization. Bridged bi(arylamido) Group-4 compounds for olefin polymerization are described by D. H. McConville, et al., in *Organometallics*, 1995, 14, pp. 5478-5480. This reference presents synthetic methods and compound characterizations. Further work appearing in D. H. McConville, et al, *Macromolecules,* 1996, 29, pp. 5241-5243, describes bridged bis(arylamido) Group-4 compounds that are polymerization catalysts for 1-hexene. Additional invention-suitable transition metal compounds include those described in WO 96/40805. Cationic Group 3 or Lanthanide-metal olefin polymerization complexes are disclosed in co-pending U.S. Ser. No. 09/408,050, filed 29 Sep. 1999. A monoanionic bidentate ligand and two monoanionic ligands stabilize those catalyst precursors, which can be activated with this invention's ionic cocatalysts.

The literature describes many additional suitable catalyst-precursor compounds. Compounds that contain abstractable ligands or that can be alkylated to contain abstractable ligands suit this invention. See, for instance, V. C. Gibson, et al; "The Search for New-Generation Olefin Polymerization Catalysts: Life Beyond Metallocenes," *Angew. Chem. Int. Ed.,* 38, pp. 428-447, (1999).

This invention may also be practiced with the catalysts containing phenoxide ligands such as those disclosed in EP 0 874 005 A1, which in incorporated herein by reference.

This invention may also be practiced with the catalysts disclosed in U.S. Pat. No. 7,812,104; WO 2008/079565; WO 2008/109212; U.S. Pat. No. 7,354,979; U.S. Pat. No. 7,279,536; U.S. Ser. No. 12/016,346; and U.S. Pat. No. 8,058,371; which are incorporated herein by reference.

Particularly useful metallocene catalyst and non-metallocene catalyst compounds are those disclosed in paragraphs [0081] to [0111] of U.S. Ser. No. 10/667,585 and paragraphs [0173] to [0293] of U.S. Ser. No. 11/177,004, the paragraphs of which are fully incorporated herein by reference.

Metallocene catalyst compounds useful herein may also be represented by the formula:

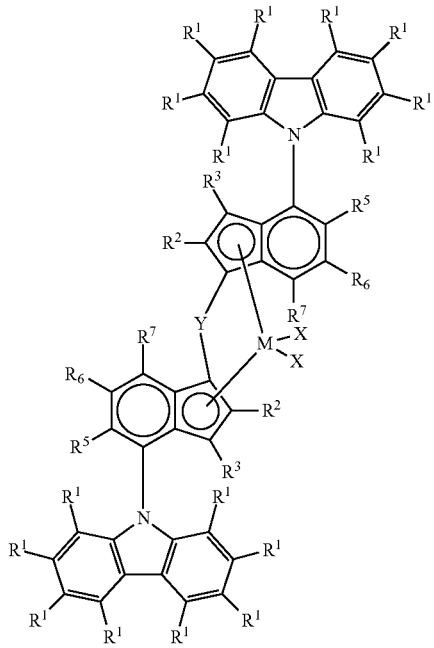

wherein
M is a transition metal selected from Group 4 of the Periodic Table of the Elements (preferably Hf or Zr, preferably Zr);
each $R^1$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$ groups may join together to form a substituted or unsubstituted, saturated, partially unsaturated, or aromatic cyclic or polycyclic substituent;
each $R^2$, $R^3$, $R^5$, $R^6$ and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;
Y is a bridging group (preferably Y is A* as described above); and
each X is, independently, is as defined for Q* above, preferably, each X is a halogen or hydrocarbyl, such as methyl. For more information on such catalyst compounds, please see U.S. Pat. No. 7,812,104, which is incorporated herein by reference.

Additional useful catalyst compounds are also described in U.S. Pat. No. 6,506,857, which is incorporated herein by reference.

Useful catalyst compounds include one, two three or more of:
dimethylsilyl-bis[2-methyl-4-(carbazol-9-yl)inden-1-yl]zirconiumdimethyl,
dimethylsilyl-bis[2-methyl-4-(carbazol-9-yl)inden-1-yl]zirconium dichloride,
µ-dimethyl silylbis(2-methyl, 4-phenylindenyl) zirconium (or hafnium)dichloride,
µ-dimethyl silylbis(2-methyl, 4-phenylindenyl) zirconium (or hafnium)dimethyl,
µ-dimethyl silylbis(2-methyl, 4-(3',5'-di-t-butylphenyl)indenyl) zirconium (or hafnium)dimethyl,
µ-dimethyl silylbis(2-methyl, 4-(3',5'-di-t-butylphenyl)indenyl) zirconium (or hafnium)dichloride,
1,1'-bis(4-triethylsilylphenyl)methylene-(cyclopentadienyl) (2,7-di-tertiary-butyl-9-fluorenyl)hafnium dichloride,
1,1'-bis(4-triethylsilylphenyl)methylene-(cyclopentadienyl) (2,7-di-tertiary-butyl-9-fluorenyl)hafnium dimethyl,
dimethylsilyl(tetramethylcyclopentadienyl)(cyclododecylamido)titanium dimethyl,
dimethylsilyl(tetramethylcyclopentadienyl)(cyclododecylamido)titanium dichloride,
1,1'-bis(4-triethylsilylphenyl)methylene-(cyclopentadienyl) (2,7-di-tertiary-butyl-9-fluorenyl)hafnium dichloride,
1,1'-bis(4-triethylsilylphenyl)methylene-(cyclopentadienyl) (2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl) zirconium dichloride,
dimethylsilyl bis(2-methylindenyl) zirconium dimethyl,
dimethylsilyl bis(2-methylfluorenyl) zirconium dichloride,
dimethylsilyl bis(2-methylfluorenyl) zirconium dimethyl,
dimethylsilyl bis(2-methyl-5,7-propylindenyl) zirconium dichloride,
dimethylsilyl bis(2-methyl-5,7-propylindenyl) zirconium dimethyl,
dimethylsilyl bis(2-methyl-5-phenylindenyl) zirconium dichloride,
dimethylsilyl bis(2-methyl-5-phenylindenyl) zirconium dimethyl,
dimethylsilyl bis(2-ethyl-5-phenylindenyl) zirconium dichloride,
dimethylsilyl bis(2-ethyl-5-phenylindenyl) zirconium dimethyl,
dimethylsilyl bis(2-methyl-5-biphenylindenyl) zirconium dichloride, and
dimethylsilyl bis(2-methyl-5-biphenylindenyl) zirconium dimethyl.

In a useful embodiment, the coordination catalyst is 1,1'-bis(4-triethylsilylphenyl)methylene-(cyclopentadienyl) (3,8-di-tertiary-butyl-1-fluorenyl) hafnium chloride, or 1,1'-bis(4-triethylsilylphenyl)methylene-(cyclopentadienyl)(3,8-di-tertiary-butyl-1-fluorenyl) hafnium dimethyl (numbering assumes the bridge is the 1 position).

In some embodiments, two or more different catalyst compounds are present in the catalyst system used herein. In some embodiments, two or more different catalyst compounds are present in the reaction zone where the process(es) described herein occur. When two transition metal compound-based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand, which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The terms "co-catalyst" and "activator" are used herein interchangeably and are defined to be any compound which can activate any one of the catalyst precursor compounds described above by converting the neutral catalyst precursor compound to a catalytically active catalyst compound. Non-limiting activators, for example, include alumoxanes, aluminum alkyls, ionizing activators (also referred to as non-coordinating anion activators), which may be neutral or ionic, and conventional-type co-catalysts. Preferred activators typically include, alumoxane compounds, modified alumoxane compounds, and ionizing anion precursor compounds that abstract a reactive, σ-bound ligand (for example, chloride or alkyl, most often methyl) making the metal complex cationic and providing a charge-balancing noncoordinating or weakly coordinating anion.

Alumoxane Activators

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) co-catalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (M=metal catalytic site). The minimum activator-to-catalyst compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Alternately, alumoxane is present at zero mol %, alternately the alumoxane is present at a molar ratio of aluminum to catalyst compound transition metal less than 500:1, preferably less than 300:1, preferably less than 100:1, preferably less than 1:1.

Non-Coordinating Anion Activators

The term "non-coordinating anion" (NCA) means an anion which either does not coordinate to a cation or which is only weakly coordinated to a cation by, for example, forming a tight ion pair, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible with and stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combinations thereof. It is also within the scope of this invention to use neutral or ionic activators alone or in combination with alumoxane or modified alumoxane activators.

The catalyst systems of this invention can include at least one non-coordinating anion (NCA) activator. Specifically, the catalyst systems include one or more NCA, which either do not coordinate to a cation or which only weakly coordinate to a cation, thereby remaining sufficiently labile to be displaced during polymerization.

The terms "co-catalyst" and "activator" are used herein interchangeably and are defined to be any compound which can activate any one of the catalyst compounds described above by converting the neutral catalyst compound to a catalytically active catalyst compound cation.

In a preferred embodiment boron-containing NCA, activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron-containing, non-coordinating anion having the charge d−; d is 1, 2, or 3.

The cation component, $Z_d^+$ may include Bronsted acids, such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds, which may be used as an activating co-catalyst are the compounds described as (and particularly those specifically listed as) activators in U.S. Ser. No. 61/494,730, filed Jun. 8, 2011, which is incorporated herein by reference.

Most preferably, the ionic stoichiometric activator $Z_d^+$ $(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

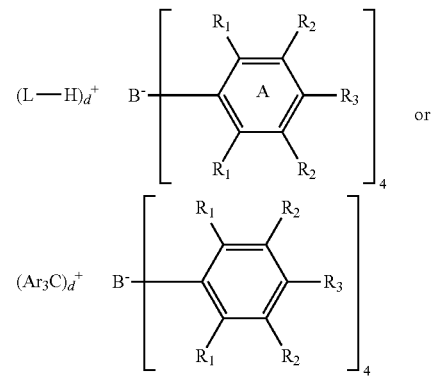

where:
each $R_1$ is, independently, a halide, preferably a fluoride;
Ar is a substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and
L is a neutral Lewis base; $(L-H)^+$ is a Bronsted acid; d is 1, 2, or 3;
wherein the anion has a molecular weight of greater than 1020 g/mol;
wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic A, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see, for example, U.S. Pat. No. 5,153,157; U.S. Pat. No. 5,453,410; EP 0 573 120 B1; WO 94/07928; and WO 95/14044; which discuss the use of an alumoxane in combination with an ionizing activator).

Optional Scavengers and Chain Transfer Agents

In some embodiments, when using the complexes described herein, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group 13 organometallic compounds of U.S. Pat. Nos. 5,153,157; 5,241,025; and WO-A-91/09882; WO-A-94/03506; WO-A-93/14132; and that of WO 95/07941. Exemplary compounds include alkyl aluminum compounds, such as triethylaluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum can be used. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Particularly useful scavengers are trialkyl- or triarylaluminum compounds, such as those represented by the formula: $AlR_3$, where R is a $C_1$ to $C_{20}$ group, such as a $C_1$ to $C_{20}$ alkyl or $C_1$ to $C_{20}$ aryl (such as methyl, ethyl, propyl, butyl, pentyl, hexyl, octyl, cyclopentyl, cyclohexyl, benzyl or phenyl groups and the like, including all their isomers, for example, tertiary butyl, isopropyl, and the like). Particularly useful scavengers include: trimethylaluminum, triethylaluminum, triisobutylaluminum, tri-n-hexylaluminum, tri-n-octylaluminum, and the like.

Chain transfer agents may also be used herein. Useful chain transfer agents that may also be used herein are typically a compound represented by the formula $AlR_3$, $ZnR_2$ (where each R is, independently, a $C_1$ to $C_{20}$, preferably $C_1$-$C_8$ alkyl or aryl radical, preferably methyl, ethyl, propyl, butyl, penyl, hexyl, octyl, benzyl, phenyl or an isomer thereof) or a combination thereof, such as diethyl zinc, trimethylaluminum, triisobutylaluminum, trin-octyl-aluminum, or a combination thereof. A combination of scavenger and chain transfer agent can also be useful, such as dialkyl zinc in combinating with a trialkylaluminum. Diethylzinc in combination with one or more of trimethylaluminum, triisobutylaluminum, and tri-n-octylaluminum is also useful.

Diluents

Diluent means an inert diluting or dissolving agent. Diluent is specifically defined to include chemicals that can act as solvents, including chemicals that can act as solvents for the catalyst compounds, scavengers, other metal complexes, activators, monomers or other additives and the product polymer. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not chemically react with the catalyst system components, monomers, etc., to any appreciable extent. Additionally, the term diluent includes mixtures of at least two or more diluent compounds.

In the processes of the present disclosure the diluent is typically part of the refluxing stream that removes the heat of reaction and the heat generated by the optional mixer in the reactor. The choice of solvent is driven by engineering and economic considerations, such as, for example, price, availability, boiling point, etc. Heavier, higher density, and aromatic liquids may provide better solubility for the other components of the polymerization medium thus are better for avoiding fouling. However, they may be more difficult to remove from the final product. While the process can employ a great number of various solvents that ensure stable operations, these factors need to be carefully considered and balanced when choosing the solvent.

Suitable diluents useful for polymerization include non-coordinating, inert liquids. Examples include straight and branched-chain paraffinic hydrocarbons, such as isobutane, butane, pentane, isopentane, hexanes, isohexane, heptane, isoheptanes, octane, isooctanes, decane, isodecanes, dodecane, isododecanes, and mixtures thereof; cyclic and alicyclic hydrocarbons, such as cyclohexane, cycloheptane, methylcyclopentane, methylcyclohexane, methylcycloheptane, and mixtures thereof, such as can be found commercially (Isopar™); halogenated and perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable diluents also include liquid olefins, which may also act as monomers or comonomers including ethylene, propylene, 1-butene, 1-hexene, 1-pentene, 3-methyl-1-pentene, 4-methyl-1-pentene, 1-octene, 1-decene, and mixtures thereof. In some embodiments, aliphatic hydrocarbon solvents are used as the diluent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the diluent is not aromatic, preferably aromatics are present in the diluent at less than 1 wt %, preferably less than 0.5 wt %, preferably less than 0.1 wt % based upon the weight of the diluents.

Polyolefin Products

This invention also relates to compositions of matter produced by the methods described herein.

The processes described herein may be used to make olefin homo-polymers or co-polymers, preferably homo- or co-polymers of $C_2$ to $C_{100}$ olefin monomers. Preferably the polymers are ethylene or propylene rich (e.g., more than 50 mol % of either ethylene or propylene), can comprise one (homopolymer), two (copolymer), three (terpolymer), or four (tetrapolymer) monomers. The list of monomers comprises ethylene, propylene, $C_4$-$C_{16}$ alpha olefins and non-conjugated dienes advantageously with at least one vinylic or other reactive double bond. The comonomers may be linear (such as alpha olefins and alpha-omega-dienes) or may contain one or multiple rings (such as styrene, cyclopentadiene, dicyclopentadiene, ethylidenenorbornene, vinylnorbornene, etc.). The breadth of the molecular weight distribution of the polymer (characterized herein by the ratio of the weight and number average molecular weights, or Mw/Mn) can range from 1.5 to 7.0. Also, the molecular weight distribution may be mono-, or bi-, or multimodal characterized by one, two, or more than two peaks in the gel-permeation chromatography (GPC) light-scattering detector trace. When more than one molecular weight population is present, the peaks in the GPC trace may or may not be fully resolved. In the latter case, i.e., when the peaks overlap, the second, third, etc., peaks may be observed as shoulders on the larger peak. Often, multimodal distributions also result in broadening the molecular weight distribution yielding increased Mw/Mn values. Such bi- and multi-modal distributions may be obtained by known methods in the art of polymerization, such as using multiple reactors operating at different conditions in series or in parallel, or using more than one catalyst in the same reactor, or macromer incorporation, etc. The homo- and co-polymer's weight average molecular weight (Mw) can range from 5,000 to 1,000,000 g/mol, or 5,000 to 800,000 g/mol, or from 6,000 to 600,000 g/mol, or from 10,000 to 600,000 g/mol.

In some embodiments, the process described herein produces propylene homopolymers and/or propylene copolymers, such as propylene-ethylene and/or propylene-alpha-olefin (preferably $C_3$ to $C_{20}$) copolymers (such as propylene-hexene copolymers or propylene-octene copolymers) having: a Mw/Mn from 1 to 10 (or from 1 to 7, or from 1 to 5, or from 1 to 4, or from 1 to 3).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In some embodiments, the monomer is ethylene and the comonomer is hexene, preferably from 1 to 15 mol % hexene, alternately 1 to 10 mol %.

In an embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. Preferred diene monomers are preferably $C_4$ to $C_{30}$, having at least two unsaturated bonds, preferably selected from alpha, omega-diene monomers (i.e., di-vinyl monomers). More preferably, the diene monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Typically, the polymers produced herein have an Mw of 5,000 to 1,000,000 g/mol (preferably 6,000 to 750,000 g/mol, preferably 25,000 to 500,000 g/mol), and/or an Mw/Mn of greater than 1 to 40 (alternately from 1.2 to 20, alternately from 1.3 to 10, alternately from 1.4 to 5, or from 1.5 to 4, alternately from 1.5 to 3).

In a preferred embodiment the polymer produced herein has either a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in US 2006/0173123, page 24-25, paragraphs [0334] to [0341].

In a preferred embodiment the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In a useful embodiment, the evaporative reactor system described herein is used to produce polypropylene, preferably having a melting point of 100° C. or more (as measured by DSC as described in US 2008/0045638), preferably 110° C. or more, or 120° C. or more, or 125° C. or more, or 130° C. or more, or 140° C. or more, or 150° C. or more, or 155° C. or more, or 158° C. or more, or 160° C. or more. Preferably the polypropylene is isotactic. By isotactic is meant that the polymer has at least 50% (preferably at least 75% or at least 85%, or at least 90%, or at least 95%) isotactic pentads (as determined by $^{13}$C NMR as described in US 2008/0045638).

Alternately, in another useful embodiment, the evaporative reactor system described herein is used to produce ethylene propylene copolymers, preferably having a glass transition temperature(Tg) of −15° C. or less, or −20° C. or less, or −25° C. or less, or −30° C. or less (as measured by Dynamic Mechanical Analysis as described in US 2008/0045638).

In a preferred embodiment of the invention, isotactic polypropylene is made in one evaporative reactor system and ethylene propylene rubber is made in a second evaporative reactor system and the two are combined, typically by melt blend, such as in an extruder. The two reactors may be in series or parallel configuration. Parallel operation mode is typically easier to control and more flexible, thus often advantageous.

In another preferred embodiment of the invention, isotactic polypropylene is made in a first evaporative reactor system, then transferred to a second evaporative reactor system where ethylene propylene rubber is then made such that the two are intimately dispersed, and preferably the two form an impact copolymer having a continuous phase of isotactic polypropylene and a discontinuous phase of ethylene propylene rubber. Preferably the impact copolymer is heterophase as described in US 2008/0045638 and the impact copolymer comprises from 60 to 98 wt % propylene and from 2 to 40 wt % ethylene.

SPECIFIC EMBODIMENTS

Embodiment 1

The reactors of the present disclosure can be configured many different ways. An example of a boiling pool reactor configuration for the production of a polyolefin, such as polypropylene, is presented in FIG. 1. The configuration of FIG. 1 brings in catalyst (99), the fresh monomer (100), recycled monomer (102) and solvent (102) feeds without preheating them. In another embodiment, the monomer and solvent feeds can be introduced in the reflux line (104) thus preheating them to reduce the chance for fouling as the cold feed and the hot reaction medium is mixed. Most of the cooling of the reactor occurs from vaporization of solvent and monomer in the reactor, which is condensed (106) and returned to the reactor as reflux (104). Additional cooling is attained from the recycle of unreacted monomer and solvent (110) from further downstream in the process via a "high pressure" flash step (111) follows the reactor (105), for example, operating at 142° C. and 255 psig. This flash operates without intentional reduction in pressure from the reactor and may use a catalyst killer (115). Material transferred from the reactor (120) can, for example, be 23 wt % cement, 77% diluent and monomers at 5000 cP (centipoise). Vaporization of monomer and solvent from the "cement" is achieved by heating the cement in the flash vessel, here shown as a recirculating pump (112) operating at 36 wt % cement and approx. 50,000 cP and cement heater (113). The vapors are condensed (114) and recycled (110) to the reactor which provides added cooling to the reactor. The polymer produced (98), for example, may be a propylene homopolymer having an Mw of about 146,000 g/mol.

The process of the present invention is also useful for creating polymer blends, where each blend component is made in a separate reactor, and the components are blended while still in solution.

Embodiment 2

Figure 2:
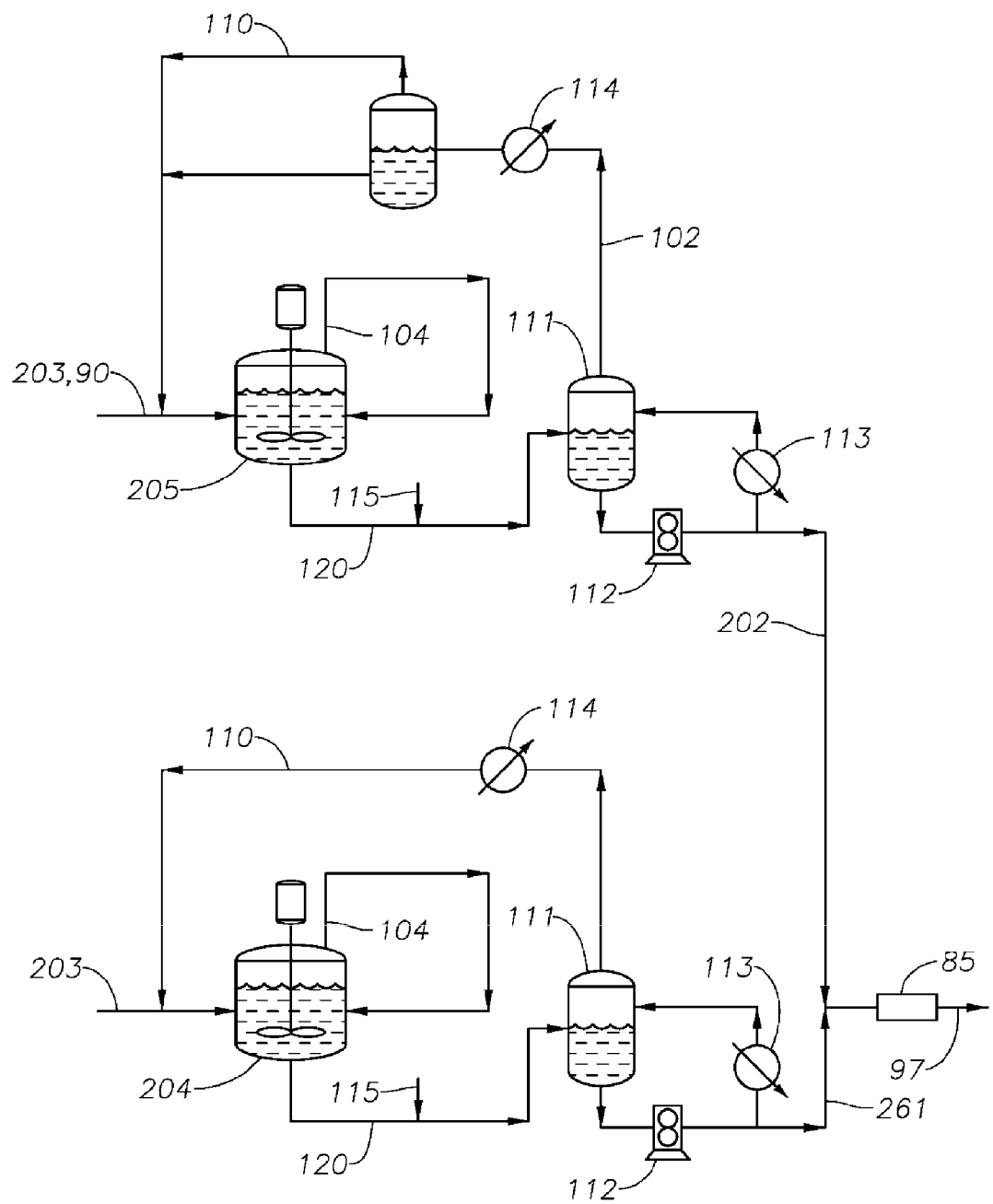
FIG. 2 represents series polymerization process for the production of isotactic polypropylene/ethylene-propylene rubber blends as described in Embodiment 2.

Parallel boiling pool reactors for production of a blend (97) of polymer, such as isotactic Polypropylene (IPP) homopolymer (201) and an Ethylene-Propylene Rubber (EPR) copolymer (202), are shown in FIG. 2. In this embodiment, ethylene (90) and propylene (203) are copolymerized in the EPR copolymer boiling pool reactor (205), and propylene (203) is homo-polymerized in the IPP boiling pool reactor (204), which may be operating at 100° C., 284 psig. Hexane (not shown) is used as the solvent in both reactors. Each reactor has a high pressure flash step (111), where a large portion of the unreacted monomers and solvent (120) is vaporized, condensed (114), and recycled (110) to the respective reactor. Vaporization of monomer and solvent is achieved by heating in the flash vessel, here shown with a recirculating pump (112) and cement heater (113). This flash operates without intentional reduction in pressure from the reactor and may use a catalyst killer (115). Cooling of the reactor also occurs from vaporization of solvent and monomer in the reactor, which is condensed (not shown) and returned to the reactor as reflux (104). The iPP (201) and EPR (201) are then combined in a mixer (85), such as an extruder, to prepare a blend of the two polymers. This configuration is particularly well-suited for creating blends using different monomer combinations, because the recycle streams from the respective high pressure flash steps are not combined before being returned to the reactors. For example, the IPP reactor only receives propylene and solvent from its high pressure flash step. No ethylene from the EPR reactor flash step is returned to the IPP reactor. This is advantageous, because it reduces or eliminates the need to separate ethylene from propylene when recycling unconverted monomers to the IPP reactor.

Embodiment 3

Series reactors for production of a blend of two polymers, such as propylene homopolymers, with different molecular weight distributions (MWD, Mw/Mn). Single-site catalysts tend to make polymers with a narrow molecular weight distribution. While this is generally good for performance of the polymer, it makes the polymers more difficult to process. The processability can be improved by broadening the MWD. One method of broadening the MWD is to produce a blend of two polymers with different MWD's. This is also referred to as a "bimodal" MWD. The average molecular weight of a polymer can be controlled by several methods, one of which is by controlling the monomer concentration. The propagation of a growing polymer chain is generally proportional to the monomer concentration, while the termination reactions are not so sensitive to monomer concentration. The average molecular weight is determined by the ratio of propagation to termination probabilities. Relatively high monomer concentrations will give higher propagation rates, and thus higher molecular weights. Therefore, one method of producing a bimodal MWD is to operate two reactors, either in series or parallel, where the monomer concentration is different in each of the reactors. Boiling pool reactors, as shown in FIG. 1, may be used to achieve this.

Embodiment 4

Figure 3:
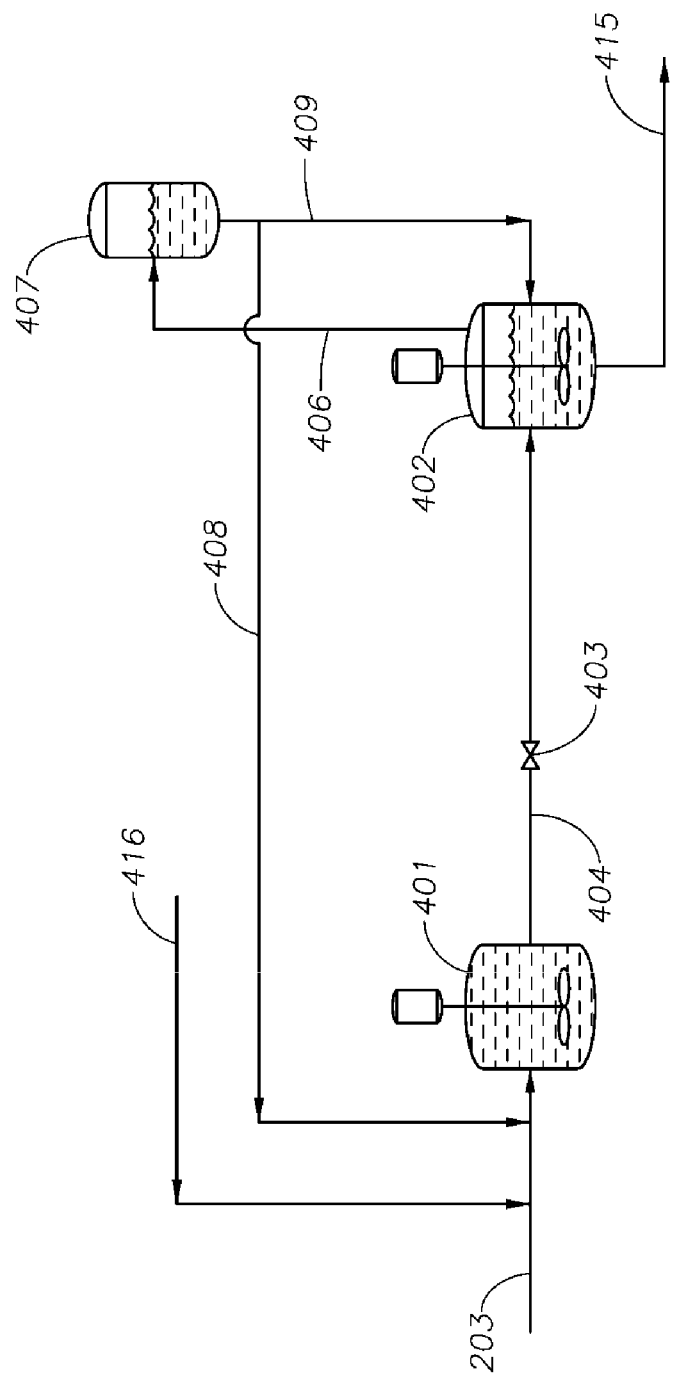
FIG. 3 represents a bimodal polypropylene polymerization process as described in Embodiment 4.

In this embodiment, a bimodal polypropylene (415) is produced in two reactors, where the first reactor is a liquid-filled reactor (401) operating at a relatively high propylene concentration (>3 M), and the second reactor (in series) is a boiling pool reactor (402) operating with a lower propylene concentration (<2 M). FIG. 3 shows a flow diagram of such a process. Propylene monomer (203) is introduced into the first reactor (401) which operates at a pressure that is above the vapor pressure of the mixture, and also high enough to achieve a single liquid phase at reaction conditions. In one case, the reactor operates at 102° C. and 54 bara with a propylene concentration of 3.6 M. The reactor (401) is preferably adiabatic (no cooling surfaces), where all of the heat of reaction is absorbed by the relatively cool feeds (not shown) being heated to reaction temperature. The reactor is well-mixed to achieve constant temperature and composition throughout the reaction volume. Various means of mixing may be used, including stirring impellers, pump-around loops, and loop reactors with axial flow pumps to induce circulation. The relatively high monomer concentration in this reactor produces a polypropylene with a relatively high molecular weight. The effluent (404) from the first reactor is fed directly to the second reactor through a pressure let-down valve (403). The second reactor is a boiling pool reactor (402). The combination of pressure let-down and heat generated from polymerization in the reactor causes unreacted monomer and solvent to vaporize. The vapors (406) are cooled and condensed (407). The liquid collected is split, where one portion is pumped to the first reactor (408), and another portion is returned to the second reactor (409). These liquid recycle/reflux streams provided cooling to both reactors, and the proportions of liquid sent to one reactor or the other can be varied to control the temperatures in each reactor. In this example, both reactors operate at about 102° C. by sending 65% of the reflux (408) to the first reactor (401) and 35% (409) to the second reactor (402). The pressure in the second reactor (402) is 14 bara, and achieves a propylene concentration of 1.6 M. The effluent from the second reactor (402) contains a concentrated (about 23 wt %) polymer blend in hexane solvent, where the polymer contains roughly equal amounts of high molecular weight polymer produced in the first reactor (401), and relatively low molecular weight polymer produced in the second reactor (402). Recycled monomer and diluent (416) may be introduced into the first reactor (401) or the second reactor (not shown).

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A continuous homogeneous phase polymerization process comprising contacting, in a first evaporative reactor system at a temperature of 50° C. or more and a pressure of 10 kPa or more, a catalyst system, optionally, a hydrocarbon diluent, and one or more monomer(s) to form a homogeneous polymerization medium, where the polymer product is dissolved in the polymerization medium at 10 wt % or more based upon the weight of the effluent at the exit of the first reactor, and where the catalyst system is dissolved in the polymerization medium and comprises an activator and a coordination catalyst precursor compound and where all or part of the polymerization medium is evaporated during the polymerization, further comprising a second evaporative reactor system operating at a temperature of 50° C. or more and a pressure of 100 kPa or more, using a catalyst system, optionally, a hydrocarbon diluent, optionally, scavenger, and one or more monomer(s) to form a homogeneous polymerization medium, where the polymer product of the second evaporative reactor system is dissolved in the polymerization medium at 10 wt % or more based upon the weight of the effluent at the exit of the second reactor, and where the catalyst system is dissolved in the polymerization medium and comprises an activator and a coordination catalyst precursor compound and where all or part of the polymerization medium is evaporated during the polymerization, wherein the polymer produced from the first evaporative reactor system is polypropylene, and wherein the polymer produced from the second evaporative reactor system is ethylene propylene copolymer or ethylene alpha-olefin copolymer where the alpha olefin has from 4 to 12 carbon atoms.

2. The polymerization process of claim 1, wherein the contacting occurs in a boiling pool reactor system.

3. The polymerization process of claim 2, wherein the boiling pool reactor system comprises a stirred tank reactor.

4. The polymerization process of claim 3, wherein the stirred tank reactor comprises a plurality of injection ports for the catalyst system.

5. The polymerization process of claim 1, wherein the catalyst system of the first evaporative reactor system and/or the second evaporative reactor system comprises one or more mono- or bis-cyclopentadienyl transition metal metallocene catalyst compounds and one or more activator(s), each being fed separately or together through the plurality of injection ports.

6. The polymerization process of claim 3, wherein the stirred tank reactor comprises one or more axial flow impeller(s), one or more radial flow impeller(s), or combinations thereof.

7. The polymerization process of claim 3, wherein the stirred tank reactor is absent a mechanical stirrer.

8. The polymerization process of claim 1, wherein the evaporated polymerization medium of the first evaporative reactor system and/or the second evaporative reactor system is collected, optionally compressed, condensed, and returned to the first and/or second reactor and recombined with the polymerization medium in the first and/or second reactor.

9. The polymerization process of claim 1, wherein the polymerization process further comprises the steps of: (a) cooling the polymerization medium of the first evaporative reactor system and/or the second evaporative reactor system; (b) supplying the cooled polymerization medium to the first and/or second reactor; and (c) removing polymer at the first and/or second reactor outlet.

10. The polymerization process of claim 1, wherein at least 5 wt % of the monomer, comonomer and diluent fed into the first and/or second reactor is evaporated in the first and/or second reactor to remove at least a part of the heat generated by the polymerization reaction.

11. The polymerization process of claim 1, wherein diluent is present in the first evaporative reactor system and/or the second evaporative reactor system.

12. The polymerization process of claim 1, wherein the diluent of the first evaporative reactor system and/or the second evaporative reactor system is hexane.

13. The polymerization process of claim 1, wherein the catalyst system of the first evaporative reactor system and/or the second evaporative reactor system comprises one or more metallocene catalyst compounds.

14. The polymerization process of claim 1, wherein the catalyst system of the first evaporative reactor system and/or the second evaporative reactor system comprises one or more of:
dimethylsilyl-bis[2-methyl-4-(carbazol-9-yl)inden-1-yl] zirconium dimethyl,
dimethylsilyl-bis[2-methyl-4-(carbazol-9-yl)inden-1-yl] zirconium dichloride,
µ-dimethyl silylbis(2-methyl, 4-phenylindenyl) zirconium (or hafnium)dichloride,
µ-dimethyl silylbis(2-methyl, 4-phenylindenyl) zirconium (or hafnium)dimethyl,
µ-dimethyl silylbis(2-methyl, 4-(3',5'-di-t-butylphenyl)indenyl) zirconium (or hafnium)dimethyl,
µ-dimethyl silylbis(2-methyl, 4-(3',5'-di-t-butylphenyl)indenyl) zirconium (or hafnium)dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilyl(tetramethylcyclopentadienyl)(cyclododecylamido)titanium dimethyl,
dimethylsilyl(tetramethylcyclopentadienyl)(cyclododecylamido)titanium dichloride,
1,1'-bis(4-triethylsilylphenyl)methylene-(cyclopentadienyl)(2,7-di-tertiary-butyl-9-fluorenyl)hafnium dichloride,
1,1'-bis(4-triethylsilylphenyl)methylene-(cyclopentadienyl)(2,7-di-tertiary-butyl-9-fluorenyl)hafnium dimethyl,
dimethylsilylbis(indenyl)hafnium dichloride,
dimethylsilylbis(indenyl)hafnium dimethyl,
dimethylsilyl bis(2-methylindenyl) zirconium dichloride,
dimethylsilyl bis(2-methylindenyl) zirconium dimethyl,
dimethylsilyl bis(2-methylfluorenyl) zirconium dichloride,
dimethylsilyl bis(2-methylfluorenyl) zirconium dimethyl,
dimethylsilyl bis(2-methyl-5,7-propylindenyl) zirconium dichloride,
dimethylsilyl bis(2-methyl-5,7-propylindenyl) zirconium dimethyl,
dimethylsilyl bis(2-methyl-5-phenylindenyl) zirconium dichloride,
dimethylsilyl bis(2-methyl-5-phenylindenyl) zirconium dimethyl,
dimethylsilyl bis(2-ethyl-5-phenylindenyl) zirconium dichloride,
dimethylsilyl bis(2-ethyl-5-phenylindenyl) zirconium dimethyl,
dimethylsilyl bis(2-methyl-5-biphenylindenyl) zirconium dichloride, and
dimethylsilyl bis(2-methyl-5-biphenylindenyl) zirconium dimethyl.

15. The polymerization process of claim 1, wherein the catalyst system of the first evaporative reactor system and/or the second evaporative reactor system comprises one or more of dimethylsilyl-bis[2-methyl-4-(carbazol-9-yl)inden-1-yl]zirconiumdimethyl and dimethylsilyl-bis[2-methyl-4-(carbazol-9-yl)inden-1-yl]zirconium dichloride.

16. The polymerization process of claim 1, wherein the catalyst system of the first evaporative reactor system and/or the second evaporative reactor system comprises one or more of µ-dimethyl silylbis(2-methyl, 4-phenylindenyl) zirconium (or hafnium)dichloride,
µ-dimethyl silylbis(2-methyl, 4-phenylindenyl) zirconium (or hafnium)dimethyl,
µ-dimethyl silylbis(2-methyl, 4-(3',5'-di-t-butylphenyl)indenyl) zirconium (or hafnium)dimethyl, and
µ-dimethyl silylbis(2-methyl, 4-(3',5'-di-t-butylphenyl)indenyl) zirconium (or hafnium)dichloride.

17. The polymerization process of claim 1, wherein the activators of the first evaporative reactor system and/or the second evaporative reactor system comprise a non-coordinating anion or alumoxane.

18. The polymerization process of claim 1, wherein the polymerization temperature of the first evaporative reactor system and/or the second evaporative reactor system is from 50° C. to 200° C.

19. The polymerization process of claim 1, wherein the polymerization medium of the first evaporative reactor system evaporated at pressures from 30 kPa to 400 kPa.

20. The polymerization process of claim 2, wherein the one or more monomer(s) of the first evaporative reactor system comprise propylene, and the monomers are contacted with a polymerization catalyst system under homogeneous polymerization conditions and at a temperature of about 100° C. to about 185° C.

21. The polymerization process of claim 1, wherein the polymerization medium of the first evaporative reactor system and/or the second evaporative reactor system comprises scavenger, a chain transfer agent, or both.

22. The process of claim 1, wherein the polymer produced from the second evaporative reactor system is ethylene propylene copolymer.

23. The process of claim 1, wherein the polymer produced from the second evaporative reactor system is ethylene alpha-olefin copolymer where the alpha olefin has from 6 to 10 carbon atoms.

24. The process of claim 1, wherein the first evaporative reactor system and the second evaporative reactor system are in a parallel configuration.

* * * * *